(12) United States Patent
Evans et al.

(10) Patent No.: US 10,428,662 B2
(45) Date of Patent: Oct. 1, 2019

(54) RETENTION DEVICE

(71) Applicant: ROLLS-ROYCE plc, London (GB)

(72) Inventors: Dale Evans, Derby (GB); Alfonso Villanueva, Derby (GB)

(73) Assignee: ROLLS-ROYCE plc, London (GB)

( * ) Notice: Subject to any disclaimer, the term of this patent is extended or adjusted under 35 U.S.C. 154(b) by 536 days.

(21) Appl. No.: 15/040,326

(22) Filed: Feb. 10, 2016

(65) Prior Publication Data

US 2016/0251973 A1    Sep. 1, 2016

(30) Foreign Application Priority Data

Feb. 27, 2015  (GB) .................................. 1503303.8

(51) Int. Cl.
  *F01D 5/32*      (2006.01)
(52) U.S. Cl.
  CPC .............. *F01D 5/323* (2013.01); *Y02T 50/672* (2013.01)
(58) Field of Classification Search
  CPC ... F01D 5/02; F01D 5/021; F01D 5/30; F01D 5/3007; F01D 5/3023; F01D 5/303; F01D 5/3038; F01D 5/3046; F01D 5/3092; F01D 5/32; F01D 5/323; F05D 2260/30; F05D 2260/38
  See application file for complete search history.

(56) References Cited

U.S. PATENT DOCUMENTS 4,474,535 A   10/1984   Dhuic
4,478,554 A   10/1984   Surdi

FOREIGN PATENT DOCUMENTS

EP    1382800 A2    1/2004

OTHER PUBLICATIONS

Aug. 13, 2015 Search Report issued in British Patent Application No. 1503303.8.

*Primary Examiner* — Jason D Shanske
*Assistant Examiner* — Danielle M. Christensen
(74) *Attorney, Agent, or Firm* — Oliff PLC

(57) ABSTRACT

The present invention provides a retention device for applying a radial force to a component (e.g. a rotor blade) within a slot (e.g. on a rotor disc). The device comprises a body having an outer surface for facing the component. The outer surface comprises a recess having a recess base with a first ramped surface extending from a lower end proximal a first lateral end of the body to an upper end. The device further comprises a spring element having a contact surface for contacting the component and a first mounting portion for mounting the spring element on the first ramped surface such that the first mounting portion is slidable along the first ramped surface towards the upper end to increase the spacing of the contact surface above the outer surface of the body.

17 Claims, 8 Drawing Sheets

RETENTION DEVICE

FIELD OF THE INVENTION

The present invention relates to a retention device, for example, a retention device for restraining a component such as a fan blade by applying a radial force.

BACKGROUND OF THE INVENTION

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

As shown in FIG. 2, the propulsive fan 12 typically comprises a fan disc 24 carrying a plurality of circumferentially-spaced, radially outwardly-extending fan blades 25. The fan disc 24 has a plurality of circumferentially arranged slots 26 provided in its rim of the fan disc. Each fan blade 25 has a root 27 and the root 27 of each fan blade 25 is arranged is a corresponding one of the slots 26 in the rim of the fan disc 24. The roots 27 of the fan blades 25 are generally dovetail-shaped in cross-section, and the slots 26 in the fan disc 24 are correspondingly shaped to receive the roots 27 of the fan blades 25.

The fan blades 25 in a gas turbine engine are relatively large, particularly in aerospace applications. When the engine is running, the blades 25 are centrifuged outward so that the dovetail roots 27 of the fan blades 25 are held in contact with, and retained by, correspondingly-shaped faces of the slots 26. However, when the engine spools down, the centrifugal force is overcome by the weight of the fan blade 25 below a certain speed. Hence, at low rotation speeds, the fan blade roots 27 tend to fall loose and move relative to the slots 26. This unconstrained movement can lead to fretting between the fan blade roots 27 and slots 26, which causes loss of the lubricant between the mating faces. There is therefore a risk of damage, if not actual damage, every time the engine is shut down or started. Similar movement, with similar consequences, may be caused by the windmilling—caused by the wind blowing through the engine—that is commonly seen when an aircraft is parked on the ground.

Fan blades 25 are typically chocked by inserting a spring-carrying slider 28 as shown in FIG. 3. The spring 29 is of a leaf design and fits to the slider 28 before being driven (using an impact tool) between the blade 25 and the base of the slot 26, such that the spring is compressed against the root 27.

Damage and/or marking to either or both of the slider 28 and the blade root 27 may occur as the slider is fitted under impact and the spring 28 surface is forced against the blade root 27. This damage is especially prevalent when the blade 25 is formed of composite material which has a lower resistance to damage and crushing stress.

Another problem with the known devices is that the spring 29 is fixed and thus radial force applied to the blade root 27 depends only on the distance between the blade root 27 and the radially inner surface of the slot 26. This distance is subject to manufacturing tolerances and thus the radial force applied by the slider 28 is subject to unpredictability. This means that the slider 28 is designed to cater for the anticipated maximum distance between the blade root 27 and the radially inner surface of the slot. As a result, unnecessary overloading on the blade root 27 may occur in the many instances where the distance between the blade root 27 and the radially inner surface of the slot 26 is less than the anticipated maximum. There remains a need for an improved retention device which at least ameliorates the above described problems.

SUMMARY OF THE INVENTION

Accordingly, in a first aspect, the present invention provides a retention device for applying a radial force to a component within a slot, said device comprising:
 a body having an outer surface for facing the component, the outer surface comprising a recess having a recess base; and
 a spring element having a contact surface for contacting the component and a first mounting portion for mounting the spring element within the recess,
 wherein the recess base comprises a first ramped surface extending from a lower end proximal a first lateral end of the body to an upper end and wherein the first mounting portion is for mounting the spring element on the first ramped surface such that the first mounting portion is slidable along the first ramped surface towards the upper end to increase the spacing of the contact surface above the outer surface of the body.

Movement of the spring element along the ramped surface allows adjustment of the spacing/height of the contact surface above the outer surface of the body and thus adjustment of the overall depth of the device. This means that the retention device can be inserted into the slot when having its minimum depth so that marking and damage of the device and component is minimised. This insertion no longer requires use of an impact tool. The device can then be adjusted by sliding of the mounting portion of the spring element over the ramp surface towards the upper end to increase the spacing/height of the contact surface above the outer surface of the body until the contact surface contacts the component and applies the desired radial force. The radial force can be selected to take account of manufacturing tolerances by selecting an appropriate sliding distance of the mounting portion along the ramp surface.

Optional features of the invention will now be set out. These are applicable singly or in any combination with any aspect of the invention.

In some embodiments, the recess base further comprises a second ramp surface having lower and upper ends. In these embodiments, the spring element may further comprise a second mounting portion for mounting the spring element on the second ramp surface such that the second mounting portion is slidable along the second ramped surface towards its upper end.

In these embodiments, the first and second ramp surfaces have the same incline.

In some embodiments, the first and second ramp surfaces extend laterally/axially within said recess.

In some embodiments, the first and second ramp surfaces are axially aligned with the lower end of the second ramp surface proximal the upper end of the first ramp surface.

In some embodiments, the first and second ramps are parallel to one another with both lower ends of the ramp proximal the first axial end of the body.

In some embodiments, the or each mounting portion is a downwardly extending leg, the or each leg extending from a surface of the spring element opposing the contact surface. The or each leg may extend laterally or transversely along the spring element.

In some embodiments, the contact surface is substantially convex.

In some embodiments, the recess is defined by lateral and/or transverse recess walls.

Where the recess is defined by lateral recess walls, the recess may comprise a transversely-enlarged portion proximal the first lateral end of the body. This effectively provides a T-shaped recess in the outer surface of the body.

Where the recess is defined by lateral recess walls, some embodiments may comprise a laterally extending transverse undercut in at least one or both of the lateral recess walls proximal the first lateral end of the body e.g. extending from the transversely-enlarged portion. The transverse undercut(s) may have an incline matching that of the first ramped surface. In these embodiments, the spring element may have comprise at least one (e.g. two opposing) transverse lug(s) for location and sliding within the undercut(s). This secures the spring element within the recess.

In some embodiments, the recess is defined only by transverse recess walls and the recess extends to the lateral edges of the body. In these embodiments, the spring element may have a transverse dimension substantially matching the transverse dimension of the body. This allows a larger transverse cross-sectional profile of the spring element which allows increased stiffness of the spring element.

In some embodiments, the outer surface of the body comprises one or more cavities (which may cooperate with the recess) for reducing the weight of the retention device.

In some embodiments, the retention device further comprises an actuator for effecting movement of the spring element over the ramp surface(s). In some embodiments, the actuator is adapted to provide a lateral/axial force on the spring element. The actuator may be adapted such that rotational movement of the actuator effects axial/lateral movement of the spring element.

In some embodiments, the actuator comprises a first threaded portion and the body comprises a threaded hole extending from the first lateral end of the body into the recess. In this way, rotational movement of the actuator and engagement between the first threaded portion of the actuator and the threaded hole effects controlled movement of the spacer portion along the ramp surface(s).

In some embodiments, the actuator is an elongated actuator having a first axial end for cooperation with the spring element.

In some embodiments, the spring element (e.g. a first lateral end of the spring element) comprises a retainer for retaining the first axial end of the actuator. In some embodiments, the retainer is a clamp portion for clamping the first axial end of the actuator.

In some embodiments, the actuator comprises a recess (e.g. an annular recess) proximal its first axial end and the clamp portion comprises clamping arms for location within said recess.

In some embodiments, the retainer comprises a chamber defined by said clamping arms, said chamber for receiving the first axial end of the actuator.

In some embodiments, the retainer comprises a threaded hole and the actuator comprises a second threaded portion at its first axial end for cooperation with the threaded hole in the spring element. This secures the actuator and spring element and maintains the position of the spring element within the recess.

In some embodiments, the spring element may comprise a downwardly-depending tab i.e. depending away from the surface opposing the contact surface. The tab may be axially-extending. The threaded hole may be provided at the first lateral end of the tab. The tab may be provided between two downwardly-depending, axially/laterally extending leg mounting portions. The recess base may further comprise an axially extending channel for accommodating the tab.

In some embodiments, the actuator comprises a head portion e.g. with a hexagonal profile at its second axial end.

In some embodiments, the spring element is movable from a first position in which the contact surface is within the recess, i.e. flush with or below the outer surface of the body, to a second position in which the contact surface is spaced above the outer surface of the body, i.e. the contact surface is no longer within the recess. In the first position, the mounting portion(s) is/are proximal the lower end(s) of the ramped surface(s). In the second position, the mounting portion(s) is/are proximal the upper end(s) of the ramped surface(s).

In a second aspect, the present invention provides a rotor assembly having rotor blade mounted within a slot in a rotor disc, said slot further housing a retention device according to the first aspect, wherein the contact surface of the spring element applies a radial force to the rotor blade.

In some embodiments, the rotor assembly further comprises a support ring for applying an axial force to the actuator and having a locking aperture for location of the actuator e.g. for location of the head of the actuator. This ensures the spring element maintains its position on the ramp surfaces(s) and thus maintains the radial force on the component (rotor blade).

In some embodiments, the support ring comprises an axially-extending flange and the locking aperture is provided in the flange.

In a third aspect, the present invention provides a gas turbine engine having a rotor assembly according to the second aspect.

In a fourth aspect, the present invention provides a method of retaining a component within a slot comprising:
  providing a retention device according to the first aspect with the spring element in a first position in which the contact surface is within the recess, i.e. flush with or below the outer surface of the body;
  inserting the retention device into said slot with the outer surface of the body facing the component; and moving the spring element to a second position in which the contact surface is spaced above the outer surface of the body, i.e. the contact surface is no longer within the recess.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
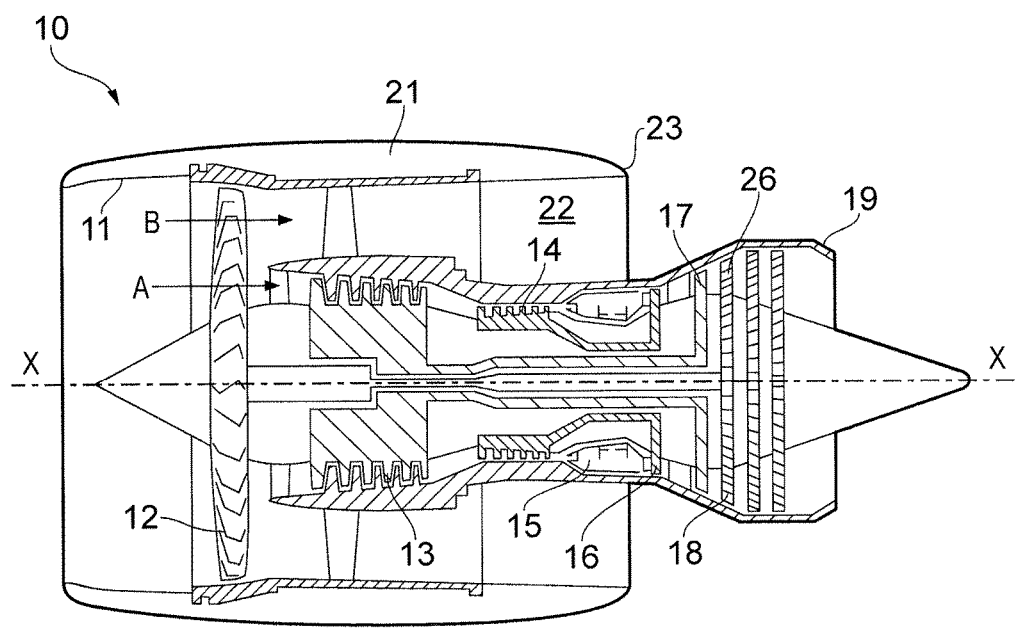
FIG. 1 shows a ducted fan gas turbine engine.
Figure 2:
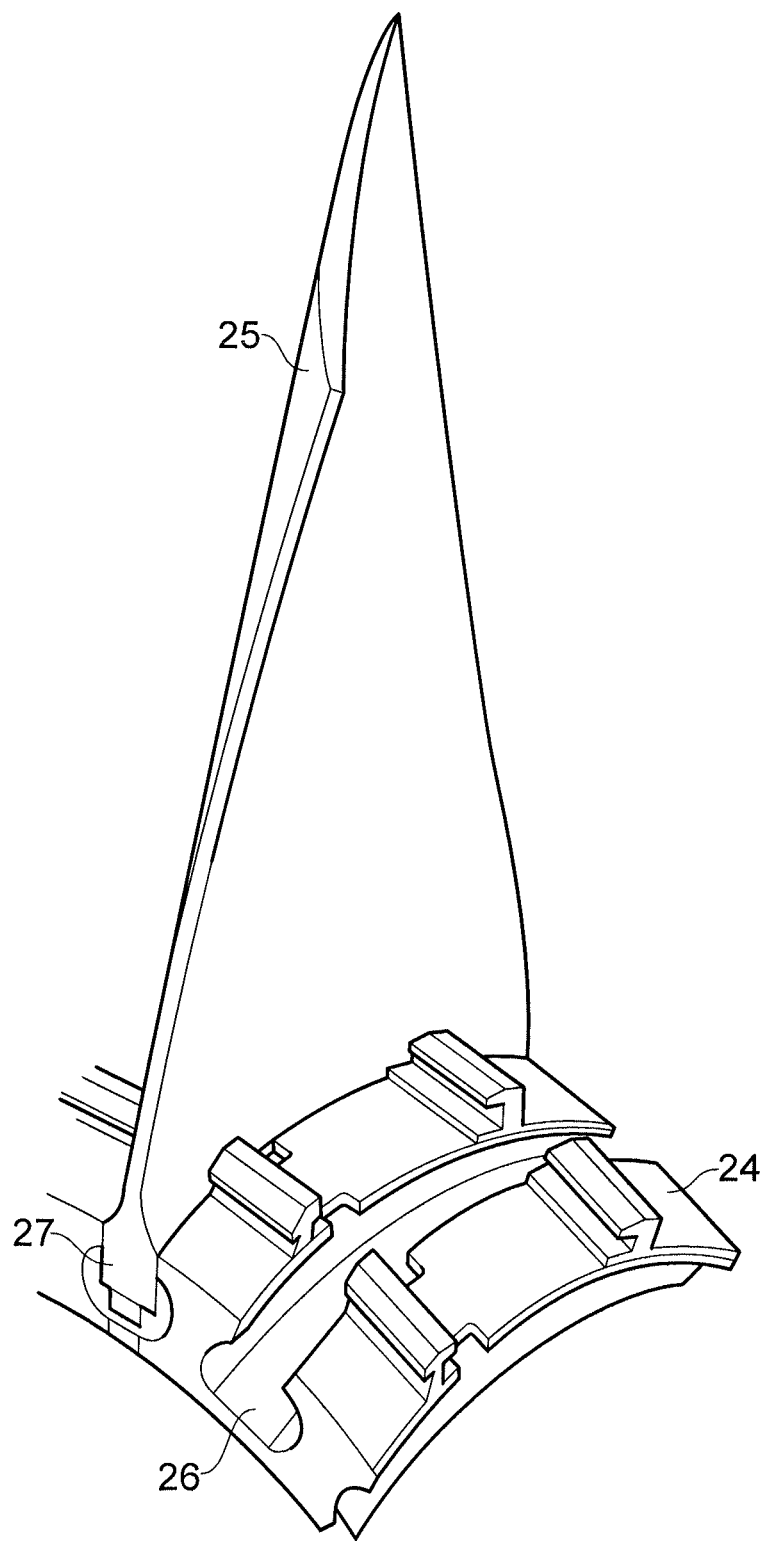
FIG. 2 shows a propulsive fan assembly.
Figure 3:
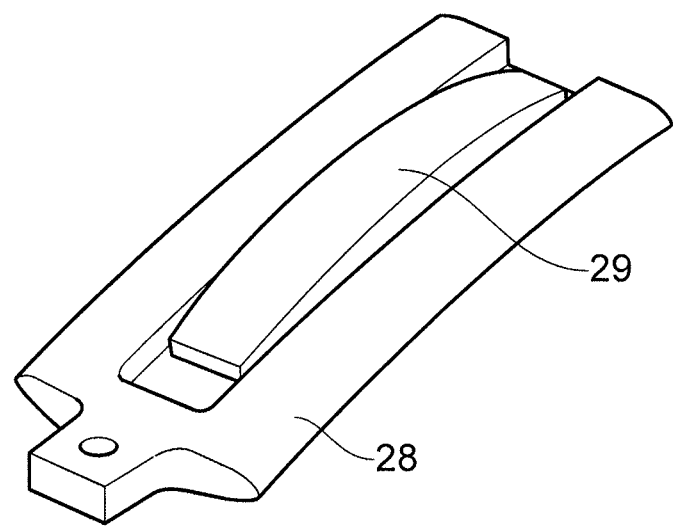
FIG. 3 shows a prior art device.
Figure 4:
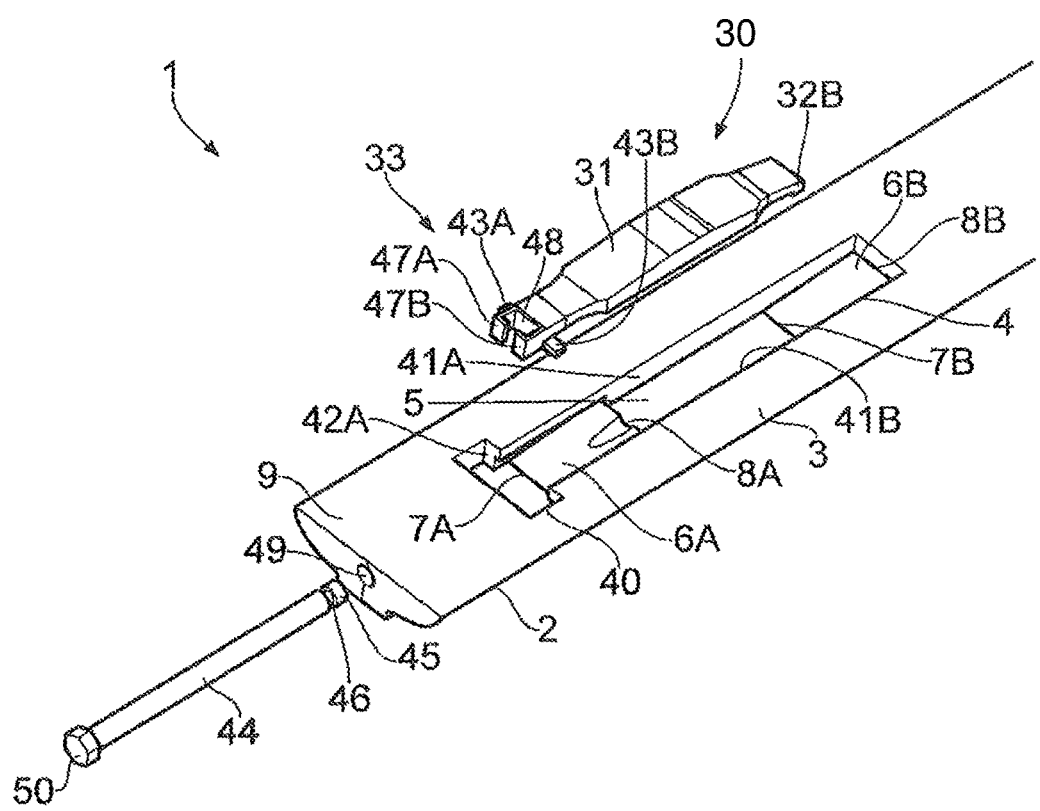
FIG. 4 shows a retention device according to a first embodiment of the present invention in a disassembled state.

As shown in FIGS. 4 to 7, a first embodiment of the present invention provides a retention device 1 for applying a radial force to a component such as a rotor blade (not shown) held within a slot in a rotor disc.

The device 1 comprises a body 2 having an outer surface 3 for facing the component. The outer surface 3 has a recess 4 having a recess base 5.

The recess base comprises a first ramped surface 6A extending from a lower end 7A to an upper end 8A. The recess base further comprises a second ramped surface 6B extending from a lower end 7B to an upper end 8B. The first and second ramp surfaces 6A, 6B extend laterally/axially within the recess 4 with both lower ends 7A, 7B of the ramp surfaces 6A, 6B proximal a first lateral end 9 of the body 2 and both upper ends 8A, 8B distal the first lateral end 9 of the body 2. The lower end 7B of the second ramp surface 6B is proximal the upper end 8A of the first ramp surface 6A. The first and second ramp surfaces 6A, 6B have the same incline.

The recess 4 comprises a transversely-enlarged portion 40 proximal the first lateral end 9 of the body 2. This effectively provides a T-shaped recess in the outer surface 3 of the body 2.

The recess 4 is further defined by lateral recess walls 41A, 41B, each lateral recess wall comprising a respective transverse undercut 42A, 42B extending laterally from the transversely-enlarged portion 40 along the lateral recess walls 41A, 41B.

The device 1 further comprises a spring element 30 having a generally convex contact surface 31 for contacting the component. Two mounting portions comprising downwardly extending legs 32A, 32B extend from the underside of the spring element 30 i.e. from the surface opposing the contact surface 31.

The legs 32A, 32B rest on and mount the spring element 30 on the ramp surfaces 6A, 6B such that the legs 32A, 32B and thus the spring element 30 are slidable along the ramped surfaces 6A, 6B.

The spring element 30 further comprises two opposing transverse lugs 43A, 43B for location and sliding within the undercuts 42A, 42B. This secures the spring element 30 within the recess 4.

The retention device further comprises an actuator 44 for effecting movement of the spring element 30 over the ramp surfaces 6A, 6B by providing 20 a lateral/axial force on the spring element.

The actuator 44 is an elongated rod having a first axial end 45 for cooperation with the spring element 30 and a head portion 50 having a hexagonal radial profile at the second axial end. The actuator comprises an annular recess 46 proximal its first axial end 45.

The spring element 30 comprises a retainer for retaining the first axial end 45 of the actuator 44. The retainer is a clamp portion 33 for having clamping arms 47A, 47B for location within the annular recess 46 of the actuator 44 to clamp the first axial end 45 of the actuator. The first axial end 45 of the actuator is held within a chamber 48 defined within the clamp portion 33.

The actuator 44 comprises a threaded portion and the body 2 comprises a threaded hole 49 extending from the first lateral end 9 of the body 2 into the transversely enlarged portion 40 of the recess 4.

Figure 5:
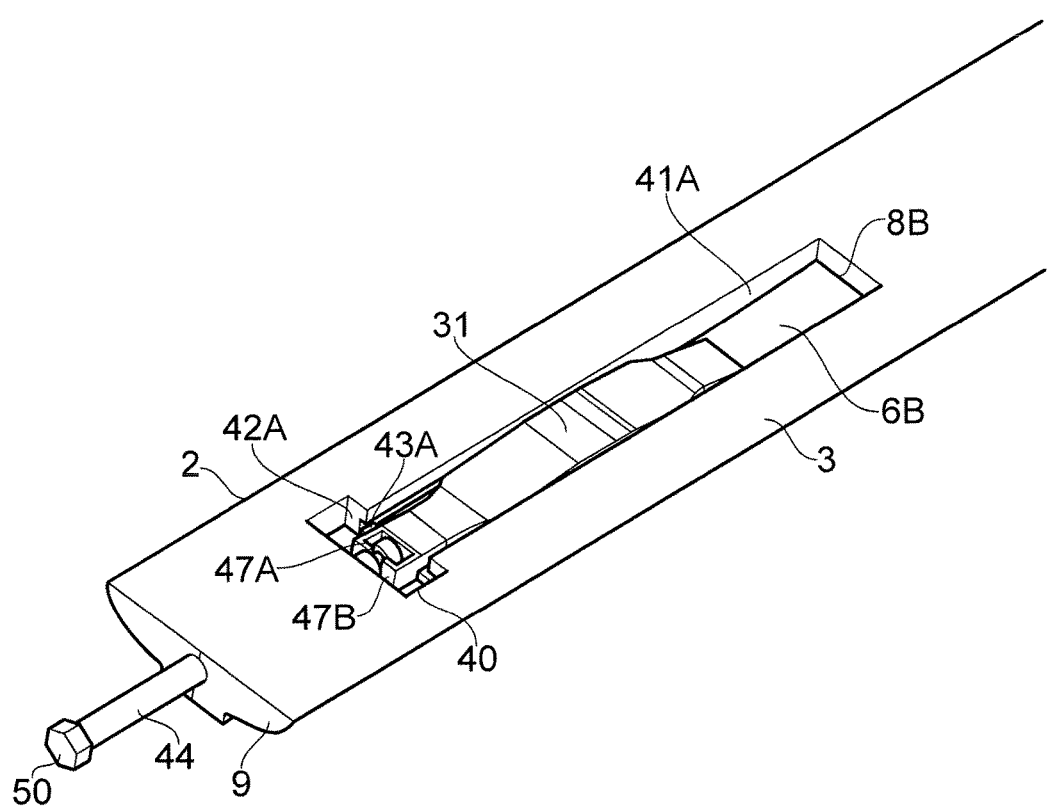
FIG. 5 shows a retention device according to a first embodiment of the present invention in an assembled state.
Figure 6:
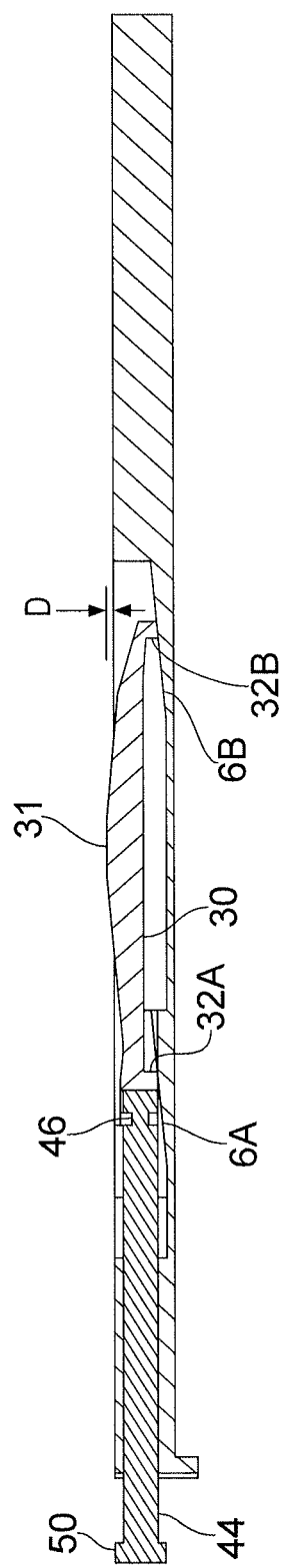
FIG. 6 shows an axial cross-sectional view through the retention device shown in FIG. 5.

In a first position, the first axial end 45 of the actuator 44 is proximal the first axial end 9 of the body such that the legs 32A, 32B of the spring element 30 are proximal the respective lower ends 7A, 7B of the ramp surfaces 6A, 6B. In this position, the spring element 30 is contained completely within the recess 4 such that the contact surface 31 is flush with the outer surface 3 of the body 2 as shown in FIGS. 5 and 6.

In this position, the retention device 1 has its minimum depth and can be inserted into the slot in the rotor disc radially inwards of the rotor blade with the outer surface 3 facing the root of the rotor blade. The retention device 1 can be inserted without the use of impact tools and without any scraping of the contact surface 3 and blade root thus minimising marking and/or damage to the device and rotor blade.

When in position in the slot of the rotor disc, a lateral/axial force can be applied to the spring element 30 by rotating the actuator 44 (e.g. using a wrench applied to the hexagonal head 50) so engagement between the threaded portion on the actuator 44 and the threads in the threaded hole 49 on the body cause the actuator to move laterally within the recess 4 away from the first lateral end 9 of the body 2.

This movement pushes the spring element such that the legs 32A, 32B slide up the ramped surfaces 6A, 6B and the transverse lugs 43A, 43B slide within the laterally extending transverse undercuts 42A, 42B.

As the legs 32A, 32B slide up the ramp surfaces 6A, 6B, the spring element 31 rises within the recess 4 such that the contact surface 31 is raised above the outer surface 3 of the body 2 by a distance D as shown in FIG. 6.

The contact surface 31 will make contact with the root of the rotor blade and will exert a radial force on the root portion proportional to the distance D. By selecting an appropriate number of turns, the radial force applied to the blade root can be fine-tuned. In this second position of the retention device, the legs 32A, 32B are proximal the upper ends 8A, 8B of the ramped surfaces 6A, 6B. The lateral extension of the ramped surface is selected such that a maximum spacing between the contact surface 31 and the outer surface 3 does not result in a radial force exceeding critical loading for the rotor blade.

Figure 7:
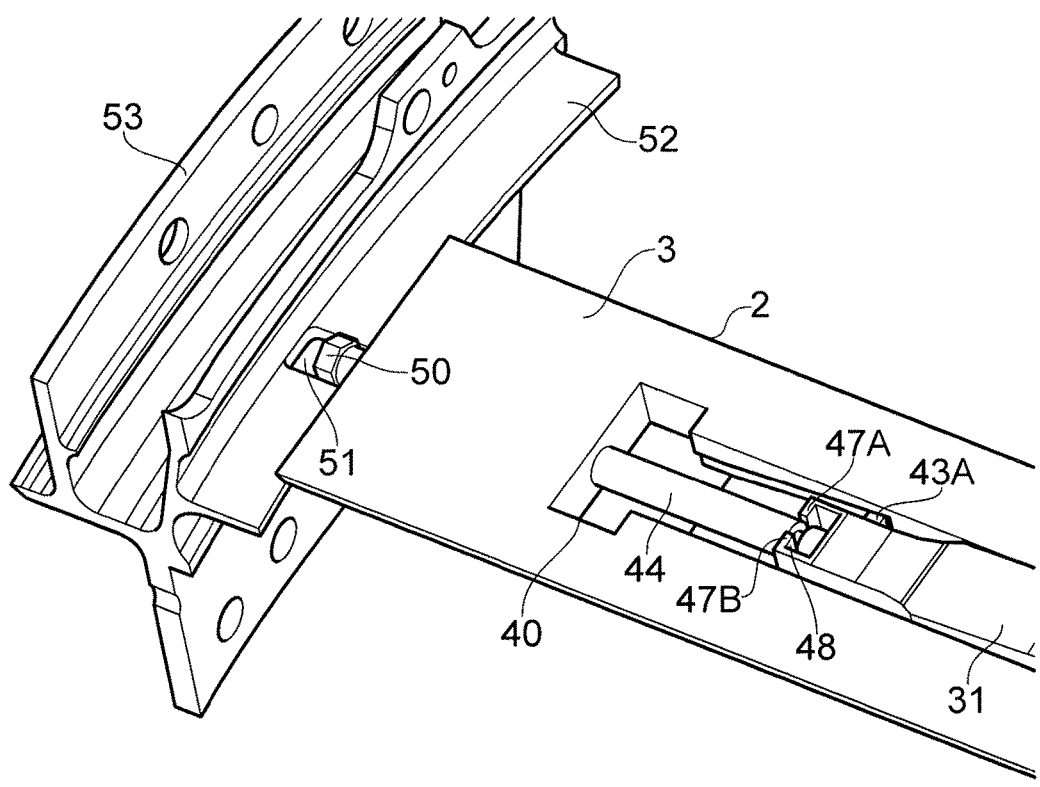
FIG. 7 shows a support ring used with the retention device shown in FIG. 5.

To ensure that the spring element 30 maintains its position on the ramp surfaces 6A, 6B and thus maintains the radial force on the rotor blade, the head 50 of the actuator 44 may be fitted into a locking aperture 51 provided on an axial flange 52 depending from a support ring 53 provided adjacent the rotor disc as shown in FIG. 7.

To remove the retention device 1, the actuator 44 is rotated in an opposite direction such that the legs 32A, 32B slide towards the lower ends 7A, 7B of the ramp surfaces 6A, 6B thus retracting the spring element 30 back inside the recess 4 and reducing the depth of the device 1 such that it can be withdrawn (e.g. by pulling the actuator) from the slot.

Figure 8:
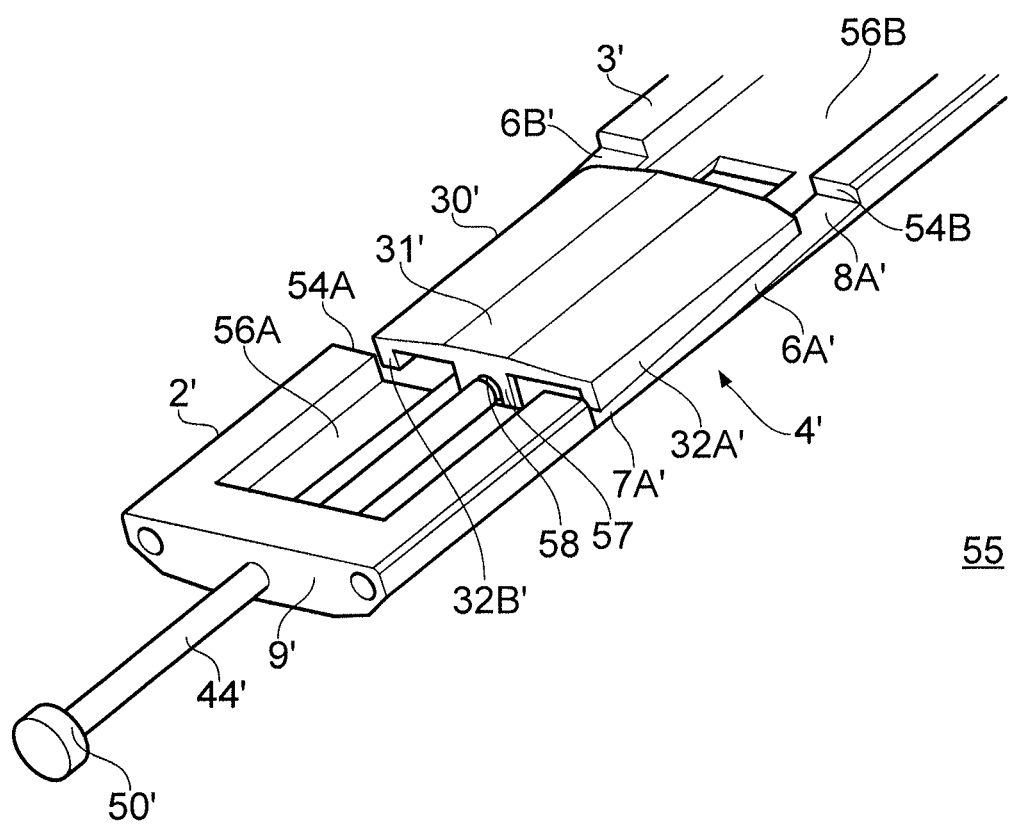
FIG. 8 shows a retention device according to a second embodiment of the present invention.

FIG. 8 shows a second embodiment of the present invention in which the first and second ramp surfaces 6A', 6B' extend laterally, parallel to one another across the recess 4' with both lower ends 7A', 7B' of the ramp surfaces 6A', 6B' located proximal the first lateral end 9' of the body 2'.

The recess 4' is defined by transverse end walls 54A, 54B and extends to the transverse edges of the body 2' (i.e. there are no laterally extending walls defining the recess). The recess base 5' further comprises a channel 55.

The outer surface 3' of the body 2' further comprises two cavities 56A, 56B extending laterally either side of the recess 4'. This is to reduce the amount of material and hence the weight of the retention device.

The spring element 30' has a transverse dimension that substantially matches the transverse dimension of the body 2'. This allows a larger transverse cross-sectional profile and increased stiffness of the spring element 30'.

The spring element 30' has two downwardly and laterally extending parallel legs 32A', 32B' depending from the underside of the spring element 30' i.e. from the surface opposing the contact surface 31'.

The legs 32A', 32B' rest on and mount the spring element 30' on the ramp surfaces 6A', 6B' such that the legs 32A', 32B' and thus the spring element 30' are slidable along the ramped surfaces 6A', 6B' as described above for the first embodiment.

The spring element 30' further comprises a downwardly- and axially-extending tab 57 which is located between the two legs 32A', 32B'. The tab 57 is located within and slidable along the channel 55 in the recess base.

The tab 57 comprises a threaded hole 58 which cooperates with a second threaded portion (not shown) on the actuator 44' to secure the actuator 44' to the spring element 30' and to maintain the spring element 31' within the recess 4'. While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A retention device for applying a radial force to a component within a slot, the device comprising:
    a body having an outer surface for facing the component, the outer surface comprising a recess having a recess base; and
    a spring element having a contact surface for contacting the component and a first mounting portion for mounting the spring element within the recess,
    wherein:
        the recess base comprises a first ramped surface, which extends from a lower end proximal a first lateral end of the body to an upper end, and a second ramped surface having a lower end and an upper end, the first ramped surface and the second ramped surface being axially aligned and extending axially or laterally within the recess and the lower end of the second ramped surface being proximal the upper end of the first ramped surface;
        the spring element comprises a second mounting portion that mounts the spring element on the second ramped surface such that the second mounting portion slides along the second ramped surface toward the upper end of the second ramped surface; and
        the first mounting portion mounts the spring element on the first ramped surface such that the first mounting portion slides along an entirety of the first ramped surface towards the upper end of the first ramped surface to increase a distance between the contact surface and the outer surface of the body.

2. The device according to claim 1, wherein the recess comprises a transversely-enlarged portion proximal the first lateral end of the body.

3. The device according to claim 1, wherein
    the recess is defined by lateral recess walls, at least one or both of the lateral recess walls comprising a laterally extending transverse undercut proximal the first lateral end of the body, and
    the spring element comprises opposing transverse lugs for a location and sliding within the laterally extending transverse undercut.

4. The device according to claim 1, wherein the first ramped surface and the second ramped surface extend parallel to one another across the recess with the lower ends of both the first ramped surface and the second ramped surface proximal the first lateral end of the body.

5. The device according to claim 1, wherein each of the first and second mounting portions comprises a downwardly extending leg extending from a surface of the spring element opposing the contact surface.

6. The device according to claim 1, wherein the contact surface is substantially convex.

7. The device according to claim 1, further comprising an actuator for effecting movement of the spring element over the first ramped surface or the second ramped surface.

8. The device according to claim 7, wherein the actuator is an elongated actuator having a first axial end for cooperation with the spring element and wherein a first lateral end of the spring element comprises a retainer for retaining the first axial end of the elongated actuator.

9. The device according to claim 8, wherein the retainer is a clamp portion for clamping the first axial end of the actuator.

10. The device according to claim 9, wherein the actuator comprises an annular recess proximal the first axial end of the actuator and the clamp portion comprises clamping arms for location within the recess.

11. The device according to claim 7, wherein the actuator comprises a threaded portion and the body comprises a threaded hole extending from the first lateral end of the body into the recess.

12. The device according to claim 1, wherein the spring element is configured to move from a first position in which the contact surface is within the recess to a second position in which the contact surface is spaced above the outer surface of the body.

13. A method of retaining a component within a slot, the method comprising:
- providing the retention device according to claim 12 with the spring element in a first position in which the contact surface is within the recess;
- inserting the retention device into the slot with the outer surface of the body facing the component; and
- moving the spring element to a second position in which the contact surface is spaced above the outer surface of the body.

14. A rotor assembly having a rotor blade mounted within a slot in a rotor disc, the slot further housing the retention device according to claim 1, wherein the contact surface of the spring element applies a radial force to the rotor blade.

15. The rotor assembly according to claim 14, further comprising a support ring for applying an axial force to an actuator.

16. The rotor assembly according to claim 15, wherein the support ring comprises an axially-extending flange and a locking aperture for cooperation with the actuator is provided in the flange.

17. A gas turbine engine having the rotor assembly according to claim 14.

* * * * *